2,946,684

DIAZOTYPE COPYING PROCESSES

Oskar Süs, Wiesbaden-Biebrich, and Heinz Schlesinger, Wiesbaden, Germany, assignors, by mesne assignments, to Keuffel & Esser Co., Hoboken, N.J., a corporation of New Jersey No Drawing. Filed June 10, 1959, Ser. No. 819,245

Claims priority, application Germany June 14, 1958

5 Claims. (Cl. 96—91)

This invention relates to diazotype light sensitive materials. More particularly, it relates to light sensitive diazotype materials of the type used for the production of intermediates.

Intermediate light sensitive diazotype materials are made on light transmitting base materials and are coated with a combination of a light sensitive diazo compound and azo dye coupling component which couples to form an azo dye which will block actinic light. It is known that, yellow or greenish yellow azo dyes can be used. Intermediate copies produced on such materials from an original are useful, for example, when large numbers of copies of an original are desired at several remote locations. Instead of transporting many copies it is only necessary to transmit the intermediate copies and additional copies can be made from these at the remote locations. Intermediates are also useful when it is desired to make corrections, additions and deletions to an original without destroying the original. The corrections etc. are made on the intermediate and additional copies can be made therefrom.

As indicated above, it is known that very satisfactory intermediate reproduction materials are obtained with the aid of light sensitive coatings which on development give yellow or greenish-yellow dyestuffs, i.e. dyestuffs which have a light absorption between about 3300 and 4400 A.U. Examples of the composition of such light sensitive coatings are given in German patent specification No. 697,744, wherein mention is made of various hydroxy compounds as azo couplers.

It has now been found that improved intermediate diazotype reproduction materials can be formed if the light sensitive diazo coating contains as the azo dye coupling component an hydroxy-dialkyl benzene corresponding to the general formula:

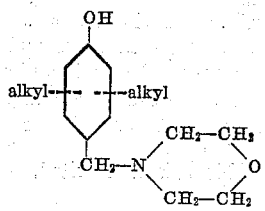

in combination with diazo compounds which upon coupling will produce yellow to greenish yellow azo dyestuffs.

Due to the presence of the hydrotropic morpholine residue the azo dye couplers of the present invention adhere well to the base materials commonly used for intermediates, e.g. naturally transparent paper, tracing paper, tracing cloth, films etc. This is one of the advantages of the present materials over the prior art materials using other types of couplers.

The diazo compounds used with the couplers of the present invention are primarily p-aminodiazo compounds. The azo dyes formed absorb light in so favorable a wavelength range in the yellow to greenish yellow part of the spectrum that they have an excellent covering power in further copying processes upon light sensitive coatings, e.g. diazo papers.

As a result of this improved covering power the copies produced have very good contrast. For example, drawings with weak contrast, such as pencil tracings with weak lines can be reproduced better than if intermediates prepared with known azo dye coupling components are used.

The hydroxy-dialkyl benzene substances corresponding to the above general formula to be used in accord with the invention as azo dye coupling components in diazo type coatings are produced by the reaction of 2,5-dialkylphenols with equimolecular quantities of formaldehyde and morpholine. It is advantageous to choose as the starting material hydroxydialkyl benzenes in which the alkyl substituents contain not more than five carbon atoms in a straight chain.

Examples (1) A solution of 3 g. of the zinc chloride double salt of the diazo compound from 1-amino-4-morpholino-benzene, 5 g. of citric acid, 2.5 g. of boric acid, 2.5 g. of aluminum sulphate, 4 g. of thiourea and 3 g. of 2,5-dimethyl-4-morpholinomethyl-phenol in 100 cc. of water is coated upon transparent paper and dried. The light sensitized paper is exposed under a master to the light of an 18 amp. arc lamp and then developed with ammonia vapor in normal manner. The image in the print thus obtained has a yellow color and is exceptionally suitable as an intermediate original for the production of further copies by the diazo copying process.

The advance achieved by means of the invention over known coatings for intermediates can be seen by comparing the percentage reflectance of light from prints obtained by copying the intermediates on diazotype paper.

The following table shows results of reflectance measurement made on prints from intermediates including 2,5-dimethyl - 4 - morpholino - methyl - phenol (according to the present invention) compared with the reflectance of prints from intermediates including 2,5-dimethyl-4-ω-dimethylamino-methyl-phenol and 3-hydroxy-benzyl alcohol (as prior art coupling components).

| Stepped Wedge | | Reflectance of Prints made from Intermediates including as coupling Component | | |
|---|---|---|---|---|
| Step | Transmission, percent | 2,5-dimethyl-4-morpholino-methyl-phenol, percent | 2,5-dimethyl-4-dimethyl-aminomethyl-phenol, percent | 3-hydroxy benzyl alcohol percent |
| | 100 | 70.0 | 70.0 | 70.0 |
| 1 | 58 | 16.8 | 53.4 | 65.0 |
| 2 | 43 | 9.3 | 15.6 | 15.2 |
| 3 | 30 | 6.0 | 7.7 | 6.7 |
| 4 | 17 | 5.3 | 6.0 | 5.3 |

For the measurements intermediates were made by contact printing through a step wedge of cellulose acetate foil. Prints were made through these intermediates on the commercially available diazo paper "Ozalid" TS of Kalle & Co. Aktiengesellschaft, Wiesbaden-Biebrich, Western Germany. The reflectance measurements were made by means of the Model II, No. 666, whiteness gauge of Spindler & Hoyer KG, Gottingen, with the appropriate white standard No. 730. The sharp drop in reflectance with decreased transmission of the step wedge obtained when 2,5-dimethyl-4-morpholino-methyl-phenol is used as the coupling component is indicative of the improved contrast obtained in prints made from the intermediates of the present invention.

2,5-dimethyl-4-morpholinomethyl-phenol is prepared by introducing with stirring into a solution of 1.026 kg. of 2,5-dimethyl-phenol in 1.2 litres of methanol, firstly, 0.85 litre of formaldehyde (30%) and then, with cooling, a mixture of 0.74 litre of morpholine and 0.8 litre of methanol. After a few days the precipitated base is separated by suction, washed well with water and dissolved in 2 litres of hot 18% hydrochloric acid. As the solution cools, the crude hydrochloride of 2,5-dimethyl-4-morpholinomethyl-phenol crystallizes out. It is separated by suction and for purification purposes ground with 0.7 litre of methanol or 0.5 litre of acetone. It can also be recrystallized from water. The hydrochloride forms colorless crystals with a melting point of 208–209° C. The free base is produced from the hydrochloride if the latter is treated with alkalis in the usual fashion, e.g. with sodium carbonate solution, and has a melting point of 146–147° C.

(2) A solution of 4 g. of 2-methyl-5-isopropyl-4-morpholinomethyl-phenol, 3 g. of citric acid, 1.5 g. of aluminum sulphate, 2 g. of thiourea, 1.5 g. of boric acid and 4 g. of the diazonium tetrafluoborate from 1-amino-3-methyl-4-methylamino-benzene in a mixture of 50 cc. of isopropyl alcohol and 35 cc. of water is coated upon a transparent paper provided with a lacquer layer of cellulose acetate. After being dried, the coating is exposed to light under a master in the usual manner and developed with ammonia vapor. An image of the master, in yellow, with good covering power, is obtained.

For the preparation of 2-methyl-5-isopropyl-4-morpholinomethyl-phenol, 20 cc. of formaldehyde (30%) are added dropwise to a solution of 30 g. of 2-methyl-5-isopropyl-phenol in 40 cc. of methanol and then a mixture consisting of 18 cc. of morpholine and 30 cc. of methanol are also added dropwise. The base crystallizes on standing and is separated by suction. After recrystallization from ethanol it forms colorless crystals with a melting point of 168–170° C.

(3) A transparent paper is coated with a solution of 4 g. of 3-methyl-6-isopropyl-4-morpholino-methyl-phenol, 5 g. of tartaric acid, 2 g. of boric acid, 2 g. of aluminum sulphate, 4 g. of 1,3,5-naphthalene trisulphonic acid (trisodium salt), 4 g. of zinc chloride double salt of the diazo compound from 1-amino-4-morpholino-benzene in 100 cc. of water and the coated paper is dried. Copies prepared on the light sensitive intermediate paper give images in yellow when developed with ammonia. These dyeline prints are excellently suited for further copying.

3-methyl-6-isopropyl-4-morpholinomethyl-phenol is obtained by condensation of 3-methyl-6-isopropyl-phenol with formaldehyde and morpholine, by the addition dropwise with stirring of 50 cc. of formaldehyde (30%) and then of a mixture of 44 cc. of morpholine and 60 cc. of methanol to a solution of 75 g. of 3-methyl-6-isopropyl-phenol in 70 cc. of methanol. On standing, 3-methyl-6-isopropyl-4-morpholino-methyl-phenol crystallizes out of the reaction mixture and is separated by suction. When recrystallized from ethyl acetate it forms colorless crystals with a melting point of 152 to 153° C.

(4) The procedure described in Example 1 is followed for the preparation of diazo paper according to the invention but the 2,5-dimethyl-4-morpholino-methyl-phenol is replaced by an equivalent quantity of 3-methyl-6-ethyl-4-morpholino-methyl-phenol. With this paper copies are also obtained that are excellently suited for further copying.

3-methyl-6-ethyl-4 - morpholinomethyl - phenol is obtained by a method analogous to those described in Examples 1 to 3, 3-methyl-6-ethyl-phenol being used as starting material. It is precipitated and isolated in the form of the hydrochloride, with a melting point of 167–168° C.

Having thus described the invention, what is claimed is:

1. A diazotype light sensitive material for the preparation of intermediate copies comprising a light transmitting base material coated with a light sensitive composition which will form after exposure and development a yellow to greenish yellow image including a light sensitive diazo compound and an azo dye coupling component of the general formula:

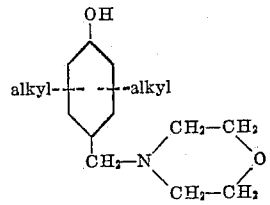

2. A diazotype light sensitive material for the preparation of intermediate copies comprising a light transmitting base material coated with a light sensitive composition which will form after exposure and development a yellow to greenish yellow image including a light sensitive diazo compound and 2,5-dimethyl-4-morpholinomethyl-phenol as an azo dye coupling component.

3. A diazotype light sensitive material for the preparation of intermediate copies comprising a light transmitting base material coated with a light sensitive composition which will form after exposure and development a yellow to greenish yellow image including a light sensitive diazo compound and 2-methyl-5-isopropyl-4-morpholinomethyl-phenol as an azo dye coupling component.

4. A diazotype light sensitive material for the preparation of intermediate copies comprising a light transmitting base material coated with a light sensitive composition which will form after exposure and development a yellow to greenish yellow image including a light sensitive diazo compound and 3-methyl-6-isopropyl-4-morpholino-methyl-phenol as an azo dye coupling component.

5. A diazotype light sensitive material for the preparation of intermediate copies comprising a light transmitting base material coated with a light sensitive composition which will form after exposure and development a yellow to greenish yellow image including a light sensitive diazo compound and 3-methyl-6-ethyl-4-morpholinomethyl-phenol as an azo dye coupling component.

No references cited.